March 24, 1931.  H. J. L. FRANK  1,797,765
TRIM CLAMP
Filed Jan. 25, 1929  2 Sheets-Sheet 1
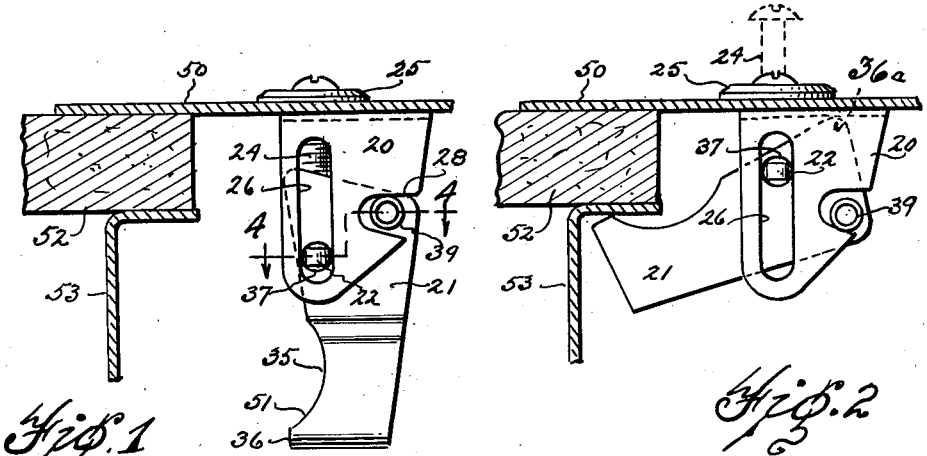
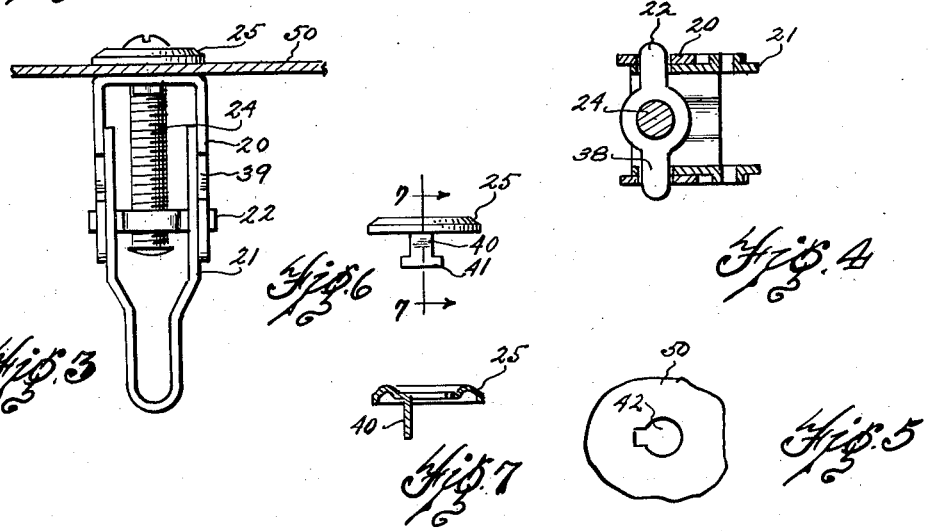
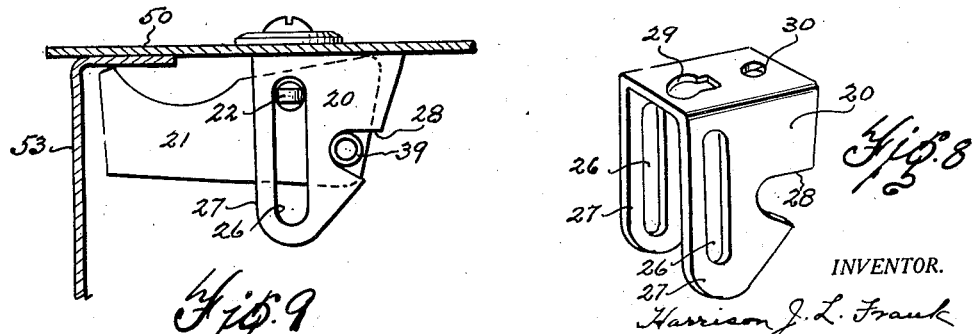
INVENTOR.
Harrison J. L. Frank
BY Francis O. Hardesty
ATTORNEY.

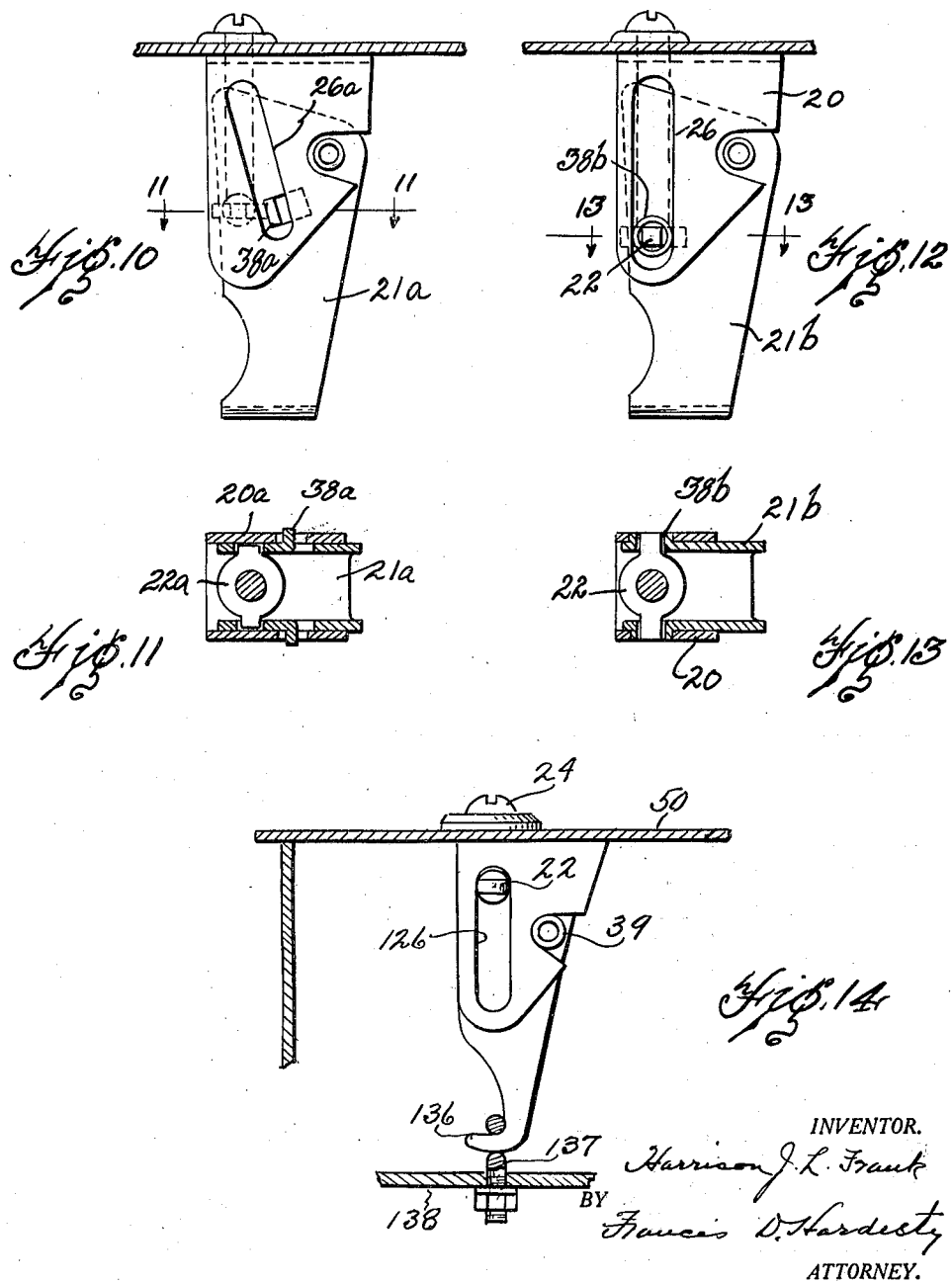

Patented Mar. 24, 1931

1,797,765

UNITED STATES PATENT OFFICE

HARRISON J. L. FRANK, OF DETROIT, MICHIGAN, ASSIGNOR TO BULL DOG ELECTRIC PRODUCTS COMPANY, OF DETROIT, MICHIGAN, A CORPORATION OF WEST VIRGINIA

TRIM CLAMP

Application filed January 25, 1929. Serial No. 334,962.

The present invention relates to trim clamps for securing in place particularly certain electrical apparatus but may be used for securing other things as well.

Among the objects of the invention is a simple and effective clamp that may be used for securing in place, in walls for example, fuse boxes or cabinets, switch boxes or other devices of that type.

Another object is a clamp of the type indicated which is useful and effective regardless of the thickness of the wall.

A further object is to provide a clamp wherein the axis of the clamping bolt will retain its original position regardless of the thickness of the wall.

Still another object is a clamp of the type indicated which is easy to install and which may be operated from the front of the fuse box or other device without the necessity of the operator using a support to hold it in place while being operated.

Still other objects will be readily apparent to those skilled in the art upon reference to the following description and the accompanying drawings, in which Fig. 1 is a side view of the clamp with the wall and fuse box in section.

Fig. 2 is a similar view showing the clamp in position to be fixed and indicating the position of the clamping screw in dotted lines before securing the clamp in place.

Fig. 3 is a view of the clamp as though from the right of Fig. 1.

Fig. 4 is a section on line 4—4 of Fig. 1.

Fig. 5 is a fragmentary view of the fuse box or other device showing the shape of the opening used therein.

Fig. 6 is a side view of the washer receiving the screw head and fixing the device in position to be locked.

Fig. 7 is a section on line 7—7 of Fig. 6.

Fig. 8 is a perspective view of one of the parts of the clamp.

Fig. 9 is a view similar to Fig. 2 showing the device used for clamping a cover plate on a metal box with no intervening wall section.

Figs. 10 and 11 show respectively an elevation and section on line 11—11 of a somewhat modified form of the device.

Figs. 12 and 13 show respectively an elevation and a section on line 13—13 of Fig. 12 of another somewhat modified form of the device, and Fig. 14 shows still another modification.

As indicated by the drawings the device comprises a U-shaped fulcrum member 20 shown in detail in Fig. 8, a clamping member 21, a traveling nut 22, a bolt 24, and a special form of washer 25.

The U-shaped fulcrum member is substantially right-triangular in side elevation and is shown in detail in Fig. 8 and is preferably made of a piece of sheet metal stamped to shape and bent up to form the U, which member is provided with guide slots 26 extending longitudinally of the side members 27 and vertical to the base of the U. These slots extend along one edge of the members 27, which may be called the front edge, while the rear sloping edge of the side members 27 are provided with notches 28. The bottom of the U is provided with a keyhole shaped opening 29 and an emergency opening 30 which is used only when the device is to be secured in place by a separate screw or bolt.

The clamping member 21 is shown in Figs. 1, 2, 3 and 9 as a U-shaped piece being at its clamping end cut away on one side as at 35 to provide a heel and to give clearance for the heel. This member near its cut away side and short distance from its open end is provided in its side members with openings 37 for the passage of the projecting ends 38 of the traveling nut 22, which traveling nut ends extend through the member 21 and into the slots 26 of the member 20.

The clamping member 21 is also provided near its rear side and near the bottom with projections 39 adapted to cooperate with the notches 28.

In the operation of the device, the projections 39 coact with notches 28 only to act as a central point about which the clamp member 21 is moved by the bolt and nut, from the position of Fig. 1 to clamping position. When the device is drawn down tightly to clamp the parts, all of the load is taken by the heel 36, the nut 22 and the toe 36a of member 21, which latter is pressed against the bottom of the member 20.

The traveling nut 22 and its projecting ends 38 are preferably of such thickness that the projecting ends extending into slots 26 shall be of such size that the nut will not rotate readily in these slots when the bolt 24 is not in place.

The washer 25 consists of a beaded washer having its central portion, instead of being punched out entirely, punched and bent down to form a tongue 40 having a T shaped end 41 thereon.

The member which it is desired to fix in position is also provided with an opening 42 about the same shape and size as the opening 29 in member 20.

In assembling the clamp the fulcrum member 20, the clamping member 21 and the traveling nut 22 will first be assembled with the projections 39 lying in the notches 28 and the traveling nut extending through the clamping member 21 and into slots 26 in the fulcrum member. The device is then placed in position on the member to be clamped with the openings 42 and 29 registering whereupon the washer 25 is placed so as to have the tongue 40 extending through both openings and moved into the rectangular portion of the openings. The bolt 24 upon being inserted through the washer and threaded into the traveling nut, prevents movement of the tongue 40 out of the rectangular or slotted part of the openings and thereby prevents separation of the parts.

It is preferred to make the several parts of such form and dimensions that the device may be assembled with the parts occupying the position shown in Fig. 1.

This permits the use of the device for clamping the apparatus which it is desired to fix into place upon any thickness of wall from the thinnest, up to a wall thickness determined largely by the cut away portion. Parallelism of the latter with the plate 50, determining about the greatest thickness which can be clamped with the device.

When the bolt 24 is tightened the heel 36 of member 21 grips the wall 52 or the metal parts 50 and 53 and holds them tightly together.

After the clamp and part 50 have been assembled in the manner described the bolt 24 is preferably riveted over or burred at its ends so that it cannot be removed accidentally or intentionally and the parts are always in position for use.

In the modified form shown in Figs. 10 and 11 the traveling nut 22a is shown as having its guide projections extending only into the clamping member 21a, while the function of the parts 38 of the first form of nut is accomplished by means of the projections 38a carried by the member 21a itself and forming a portion thereof. In this form also the guide slots 26a are shown as inclined with reference to the axis of the bolt. The action of this form of the device is quite similar to that of the foregoing forms.

In the form shown in Figs. 12 and 13 the fulcrum member 20 is similar to the form shown in Figs. 1 to 9 and the traveling nut may be of the same form but the clamping member 21b is provided with a collar 38b which extends into the guide slot 26 and serves to guide the member 21b in the same fashion as the projections 38 on the nut. In this case the nut will be as stated, of similar form to the first one, and have its projections 38 extend into the collar 38b and be movable therein. Instead of using the form of nut shown in Figs. 1 to 9, the form shown in Figs. 10 and 11 may be used as the collar 38b provides for guiding the clamping member.

In Fig. 14 is shown a form of the device in which the heel of the clamping member is modified to form a hook 136 adapted to cooperate with a suitable U-bolt 137 or eye in a wall 138 directly back of and parallel to the front wall 50. In this form of course, the guide slot 126 and projections 39 will be so proportioned and located as to permit swinging the hook 36 sufficiently far on either side of the line parallel to the axis of the ball as to permit its clearing and hooking into the element 137. By suitable modification this form of the device may even be made to swing far enough to have the function of the other forms.

While the device has been drawn as being particularly useful for fuse boxes, panel boards and cut-outs, it is also useful for any other purposes where it is desired to clamp two parts together with the clamping means inside and not particularly accessible, all of the operation of clamping being accomplished from the outside by means of the bolt 24.

Now having described the invention and the preferred form of embodiment thereof it is to be understood that the said invention is to be limited not to the specific details herein described and illustrated but only by the scope of the claims which follow:

I claim:—

1. A clamping device comprising a fulcrum member having guide slots therein, a movable clamping member fulcrumed therein, a travelling nut carried by said clamping member and having parts extending into and guided in said slots, and a bolt extending through a member to be clamped and through said fulcrum member and threaded in said nut.

2. A clamping device comprising a U-shaped fulcrum member, substantially right-triangular in side elevation and having guide slots extending along its front edges vertical to the base and notches extending into its rear sloping edges, a clamping member embraced by said U and having projections engaging said notches, a travelling nut carried by said clamping member and having projections extending into and guided by said slots, and a bolt extending up through the base of said fulcrum member and into said nut.

3. A clamping device comprising a fulcrum member having guide slots therein, a movable clamping member fulcrumed therein, a travelling nut carried by said clamping member and having parts extending into and guided in said slots, and a bolt extending through a member to be clamped and through said fulcrum member and threaded in said nut, and means to secure the device to a member to be clamped.

4. A clamping device comprising a fulcrum member having guide slots therein, a movable clamping member fulcrumed therein, a travelling nut carried by said clamping member and having parts extending into and guided in said slots, and a bolt extending through a member to be clamped and through said fulcrum member and threaded in said nut, and means to secure the device to a member to be clamped, said means comprising a washer for said bolt having a tongue adapted to extend through said member to be clamped and fix the fulcrum member thereto.

5. A clamping device comprising a fulcrum member having a guide slot therein, a movable clamping member fulcrumed thereon, a travelling nut carried by said clamping member and having a part extending into and guided in said slot, and a bolt extending through a member to be clamped and through said fulcrum member and threaded in said nut.

6. A clamping device comprising a fulcrum member having a guide slot therein, a movable clamping member fulcrumed thereon, a travelling nut carried by said clamping member and having a part extending into and guided in said slot, and a bolt extending through a member to be clamped and through said fulcrum member and threaded in said nut, and means to secure the device to a member to be clamped.

7. A clamping device comprising a fulcrum member having a guide slot therein, a movable clamping member fulcrumed thereon, a traveling nut carried by said clamping member and having means to be guided in said slot, and a bolt extending through a member to be clamped and through said fulcrum member and threaded in said nut and means to secure the device to the member to be clamped.

8. A clamping device comprising a fulcrum member having guide slots therein, a movable clamping member fulcrumed therein, a traveling nut carried by said clamping member, guide elements also carried by said clamping member and cooperating with said slots, and a bolt extending through a member to be clamped and through said fulcrum member and threaded in said nut.

9. A clamping device comprising a fulcrum member having guide slots therein, a movable clamping member fulcrumed therein, a traveling nut carried by said clamping member, guide elements also carried by said clamping member and cooperating with said slots, and a bolt extending through a member to be clamped and through said fulcrum member and threaded in said nut, said guide elements and slots of such proportions as to permit a movement of at least 90° to said clamping member.

10. In combination, a member, a washer having a keyhole alined with a similar keyhole in said member, and a tongue extending from said washer through the keyhole in the member, said tongue having lateral projections adapted to engage said member on the opposite side thereof to secure the member and washer in assembled relation, the keyhole also serving as an aperture through which a supporting bolt extends, to maintain the tongue in the keyhole slot.

11. In a clamping device, a plate, a fulcrum member secured thereto and having guide slots therein, a travelling nut carried thereby and adapted to move in said guide slots, a bolt threaded into said nut, and a clamp fulcrumed in said member and movably secured to said nut whereby the axis of the bolt may retain its original position regardless of the position of the clamp.

12. In combination, an apertured wall, a member secured to said wall over the aperture thereof, and means to secure said member to said wall, said means including a clamp loosely pivoted to said member, and a bolt passing through said member and threaded into said clamp, tightening of the bolt causing said wall to be clamped between the clamp and the plate, the bolt and the loose pivots being so arranged that the clamping action imposes no strain upon the pivots.

13. A clamping device comprising a fulcrum member having guide slots therein, a movable clamp fulcrumed in said member, a travelling nut carried by said clamp, guide elements also carried by said clamp and cooperating with said slots, and a bolt extending through a member to be clamped and through said fulcrum member and threaded into said nut, said guide elements, slots, fulcrum member and clamp being of such proportions as to permit a movement of at least 90° to said clamp.

14. A clamping device comprising a fulcrum member having a guide slot therein, a movable clamp fulcrumed thereon, a travelling nut carried by said clamp, a guide in said slot also carried by said clamp, and a bolt extending through a member to be clamped and through said fulcrum member and threaded into said nut.

15. In combination, a plate, an apertured member and an apertured washer to secure the member to the bottom of the plate, said washer having a tongue extending through the plate and member and having lateral projections thereon engaging the bottom surface of the member, and a bolt in said apertures for preventing the tongue from leaving its desired position.

16. In combination, a plate, a fulcrum member secured to said plate and having a guide slot therein, a movable clamping member fulcrumed on said fulcrum member, a traveling nut carried by said clamping member and having means guided in said slot, and a bolt extending thru said plate and threaded into said nut to exert a clamping action on said clamping member.

17. In combination, a plate, a fulcrum member secured to said plate and having a guide slot therein, a movable clamping member fulcrumed on said fulcrum member, a traveling nut carried by said clamping member and having means guided in said slot, and a bolt extending thru said plate and threaded into said nut to exert a clamping action on said clamping member, said bolt also serving as a means to secure said fulcrum member to said plate.

18. In combination, a plate, a fulcrum member secured to said plate and having a guide slot therein, a movable clamping member fulcrumed on said fulcrum member, a traveling nut carried by said clamping member and having means guided in said slot, and a bolt extending thru said plate and threaded into said nut to exert a clamping action on said clamping member, the clamping action taking place between portions of the clamping member and portions of the plate and the member to be clamped in place, the bolt in its clamping action, exercising no strain on the fulcrum member.

19. In combination, a plate, a fulcrum member secured to said plate and having a guide slot therein, a movable clamping member fulcrumed on said fulcrum member, a traveling nut carried by said clamping member and having means guided in said slot, and a bolt extending thru said plate and threaded into said nut to exert a clamping action on said clamping member, the fulcrum member and the clamping member having interengaging portions which prevent the clamping member from rotating about the bolt, as an axis, during the clamping operation.

HARRISON J. L. FRANK.